United States Patent [19]
Crowley et al.

[11] 3,710,958
[45] Jan. 16, 1973

[54] PARTS TRANSFER AND STORAGE UNIT

[75] Inventors: Norman R. Crowley; Gilbert N. Fuchs; Randall W. Wink, all of Evansville, Ind.

[73] Assignee: Evana Tool & Engineering, Inc., Evansville, Ind.

[22] Filed: May 3, 1971

[21] Appl. No.: 139,553

[52] U.S. Cl.................214/16.4 R, 53/160, 312/97.1
[51] Int. Cl..............................................B65g 47/00
[58] Field of Search....214/16.4 R; 312/97.1; 53/160; 340/174.1 C

[56] References Cited

UNITED STATES PATENTS

3,315,785   4/1967   Shiffer.........................214/16.4 A X
2,942,392   6/1960   McCain et al......................53/160 X Primary Examiner—Gerald M. Forlenza
Assistant Examiner—Frank E. Werner
Attorney—Larson, Taylor & Hinds

[57] ABSTRACT

The invention relates to a parts transfer and storage unit wherein individual parts such as printed circuit boards which are to have various manufacturing processes performed thereon may be transferred to cartridges and stored therein for movement to other locations within the manufacturing plant. The cartridges are mounted for vertical sliding movement in a plurality of guides mounted on a rotating stand. Latch means is provided for securing the cartridges within the guideways and a single drive means indexes the cartridge vertically as the individual parts are fed into the cartridge or removed therefrom. Further latch means is provided for securing the cartridges in their elevated positions so that the rotary holder may be rapidly indexed from one cartridge to the next for engagement with the drive means so that unloading or loading of the cartridges can take place at a rapid rate.

10 Claims, 11 Drawing Figures

PATENTED JAN 16 1973

INVENTORS
NORMAN R. CROWLEY
RANDALL W. WINK
GILBERT N. FUCHS

BY

ATTORNEYS

INVENTORS
NORMAN R. CROWLEY
RANDALL W. WINK
GILBERT N. FUCHS

BY Larson, Taylor and Hinds

ATTORNEYS

PARTS TRANSFER AND STORAGE UNIT

BACKGROUND OF THE INVENTION

This invention relates to a parts transfer and storage unit and more particularly to a device which is adapted to receive a plurality of cartridges, each cartridge being adapted to receive a large number of individual parts, and to index these cartridges so that the individual parts may be rapidly moved into storage in the cartridges or removed from storage for further manufacturing steps.

It is common practice in large manufacturing plants to provide parts transfer devices which are adapted to receive individual parts undergoing various manufacturing processes and to transfer these parts to other machines for subsequent operations, Obviously speed in handling of the parts is a prime consideration as is the necessity for accuracy in locating and handling of the parts to avoid malfunction of the machines.

More specifically in the manufacture of radios and like electronic equipment printed circuit boards are used which must be passed through a number of manufacturing processes in order to provide for and check the various circuit components. It is well known in the art to utilize cartridges which have as many as 100 shelves disposed therein for receiving the individual circuit boards. These cartridges may be placed at the feed end of a particular manufacturing process, for example, a resistor trimming operation, so that the individual circuit boards are fed into the machine to have the resistors checked and adjusted and the boards are then fed from the machine into cartridges disposed at the opposite end of the machine for transfer to a subsequent manufacturing step.

In the prior art various parts transfer devices have been designed for feeding the individual parts into and from the cartridges. Such devices have incorporated drive means for vertically indexing the cartridges but such mechanisms have not been entirely satisfactory either due to lack of sufficient speed or due to inaccuracies in properly locating the individual shelves of the cartridges to deliver or receive the parts. Accordingly, there has been a need in the prior art for the development of a parts transfer unit which will precisely locate the individual shelves of the cartridges for delivery or reception of a part and which is capable of moving at a high rate of speed without any consequent loss of accuracy so that the delivery and storage mechanism may operate as fast as the machine performing the manufacturing process.

SUMMARY OF THE INVENTION

According to the present invention there is provided a rotary stand having a plurality of vertically extending guideways disposed in spaced relationship around the periphery thereof. Each pair of guideways is adapted to receive a cartridge of holding a plurality of individual parts such as circuit boards.

These cartridges are vertically slidable in the guideways and are held in position by a latch retaining means vertically slidable in a slot within the guideways.

The rotary stand is adapted to index radially to bring each cartridge to a work station sequentially. At this station a chain drive means is provided which has roller lugs mounted thereon engageable with a pin on the retainer means slidable in the guideway and gripping the cartridge. Means is provided for synchronizing the vertical indexing of the cartridge with the feed means provided adjacent the work station for feeding individual circuit boards to the cartridge or for removing circuit boards from the cartridge. In the normal feeding operation the cartridge is indexed to the work station at its lower-most position. As each circuit board is fed into the cartridge the drive means indexes the cartridge vertically one step. As the cartridge moves to its upper-most position a latch element pivotally mounted in a fixed position on the rotary cartridge holder engages the retainer means for the cartridge and prevents the cartridge from dropping to its lower-most position when the rotary holder is indexed radially to bring the next cartridge into engagement with the drive means at the work station.

At a point spaced from the work station previously described an operator may be located to remove the filled cartridges from the guideways and replacing these with empty cartridges. At the time this operation is performed the operator releases the latch means holding the cartridge in its upper-most position so that the empty cartridge will be at its lower-most position at the time it indexes into position and engagement with the vertical drive means.

The mechanism according to the present invention may be operated at a substantially higher speed than prior art transfer and storage devices without any attendant loss of accuracy. The cartridge utilized for storing the individual parts is precisely located within the guideways on the rotary holder and is retained in a precise position by a retainer means vertically slidable within the guideway. The vertical indexing means is provided with a drive which assures precise vertical orientation of the cartridge with respect to the feed mechanism feeding parts to or removing parts from the shelves within the cartridge. Thus, the present invention overcomes many of the disadvantages inherent in prior art equipment of this general type.

An object of the present invention is to provide a parts transfer and storage mechanism which is adapted to be operated at a high rate of speed and which provides for a high degree of accuracy in placing parts within and removing parts from storage cartridges.

Another object of the present invention is to provide a parts transfer and storage device with means for radially indexing individual cartridges to a work station and for engagement with vertical indexing means which causes the individual cartridges to be moved step by step between upper and lower positions and wherein latch means is provided for latching the cartridges in the upper most position when disengaged from the drive means.

Other objects and many of the attendant advantages of the present invention will become more readily apparent upon consideration of the following detailed specification when taken in conjunction with the accompanying drawings wherein:

Figure 1:
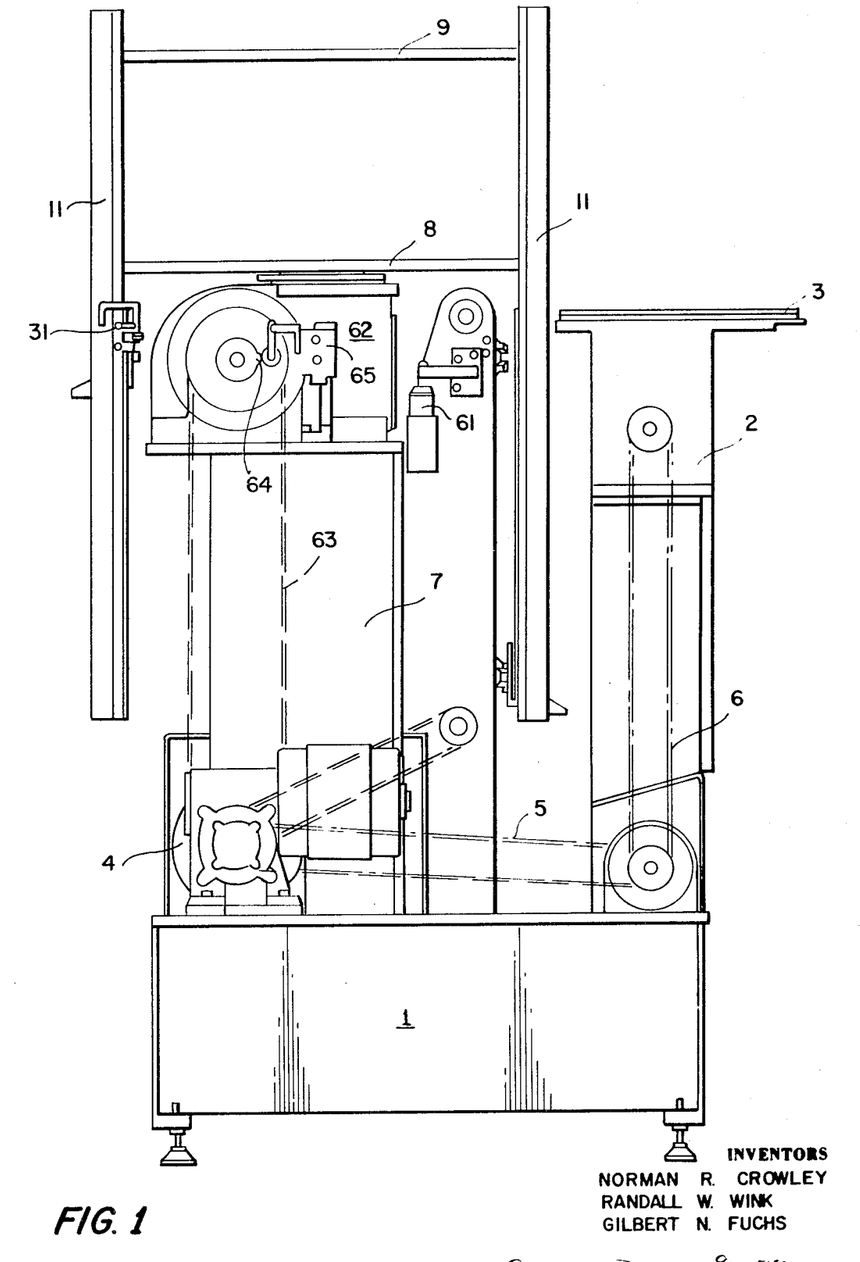
FIG. 1 is a side elevation with part broken for clarity of a parts transfer and storage device.

Referring now more specifically to the drawings wherein like numerals indicate like parts throughout the several views there is shown at 1 in FIG. 1 the base which supports all of the elements of the parts transfer and storage unit. Mounted on this base adjacent one side thereof is a feed support stand 2 upon which is mounted a walking beam 3. This walking beam type of conveyor is known in the art and is adapted to receive parts from a machine which would normally be disposed to the right as viewed in FIG. 1 and transport these parts across the top of feed support stand 2 to the left hand side of the support stand 2 where the parts are delivered for storage in cartridges as will be explained more fully hereinafter. The walking beam is driven from a motor 4 by way of drive belts 5 and 6 as is well known in the art.

Figure 2:
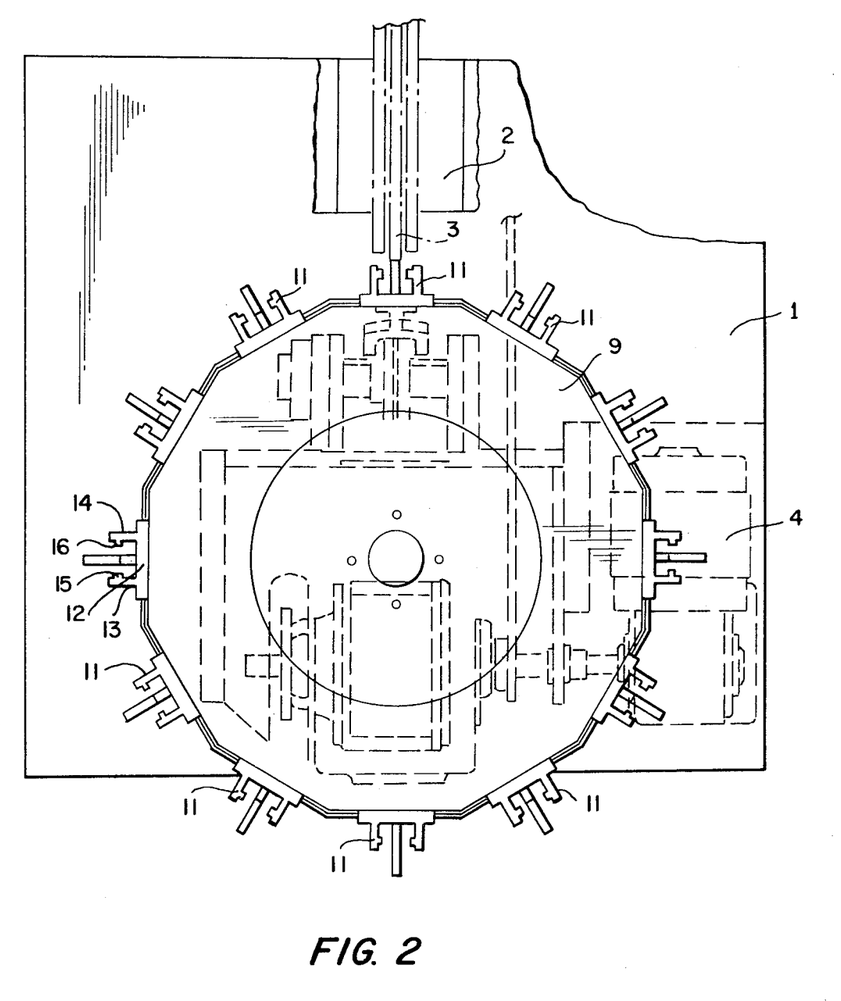
FIG. 2 is a top plan view thereof.
Figure 6:
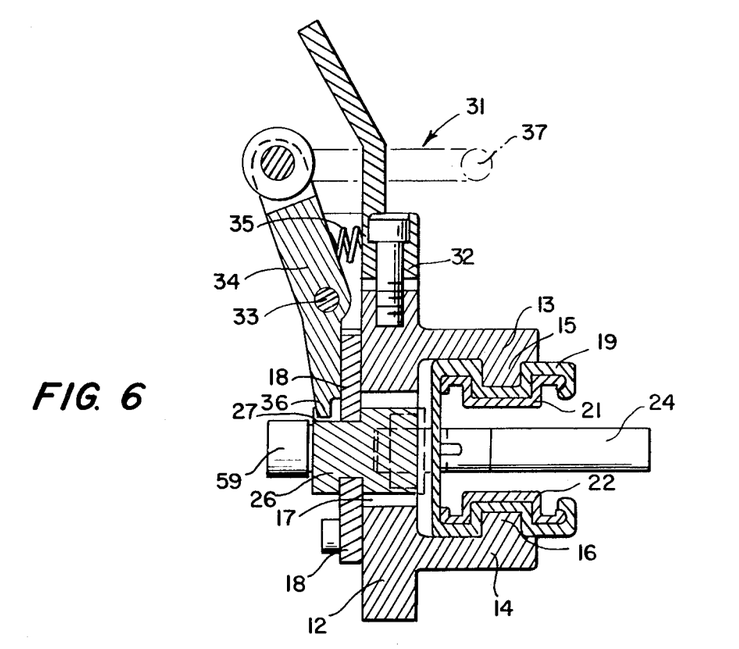
FIG. 6 is a sectional view along the line 6—6 of FIG. 5.

Supported adjacent the feed support stand 2 is a rotary cartridge support base 7. Mounted on this base 7 so as to be rotatable with respect thereto are a pair of plates having twelve flat peripheral surfaces as shown more clearly in FIG. 2. Secured to the plates 8 and 9 and extending vertically from above the upper plate 9 to a point substantially below the lower plate 8 are guideways such as shown at 11 in FIGS. 1 and 2. Each guideway comprises a back plate 12 having guides 13 and 14 extending outwardly therefrom. Guide 13 has an inwardly extending track 15 extending throughout the length thereof and guide 14 has a track 16 extending the length thereof. The back plate 12 of the guideway has a slot therein as more clearly is shown at 17 in FIGS. 3 and 6. As shown in FIG. 6 a pair of plates 18 are secured to the rear surface of back plate 12 to form guide means for the retainer means as will be explained more fully hereinafter.

Figures 3, 4:
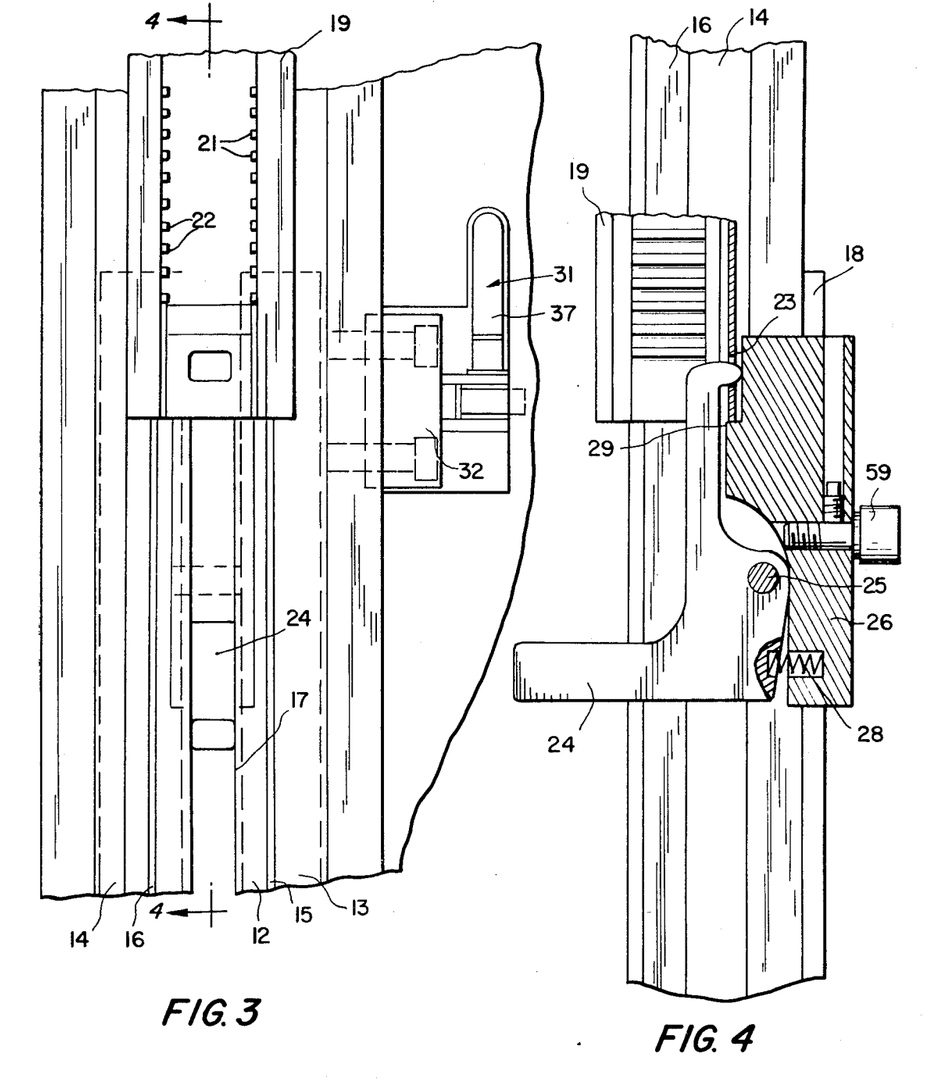
FIG. 3 is a partial elevational view showing the retainer means for the cartridge and the latch mechanism.
FIG. 4 is a sectional view along the line 4—4 of FIG. 3.

Each cartridge comprises an elongated generally channel shaped member 19 as seen in FIGS. 3, 4 and 6. As can be seen from FIG. 6 the cartridge 19 has inwardly bent portions extending along each side of the channel so as to fit within track 15 and 16 of guides 13 and 14. The interior of the cartridge 19 is provided with metallic strips 21 and 22 forming a series of slots or shelves as more clearly seen in FIGS. 3 and 4 which extend along the length of the cartridge. A printed circuit board is adapted to be received within the slots formed by strips 21 and 22 with the strips providing spacers between the individual circuit boards. The cartridges 19 are approximately one-half the length of the guideways 11 and each cartridge is adapted to be moved vertically within the guideways from a position at which upper-most or lower-most shelf is adjacent the walking beam 3 to a position wherein the lower most or upper most shelf is adjacent the walking beam. It can be seem that regardless of whether the cartridge is moved from an upper position to a lower position or from a lower position to an upper position the entire length of the cartridge is firmly supported within the fixed guideway 11 by the guides 13 and 14 and tracks 15 and 16.

Figure 6A:
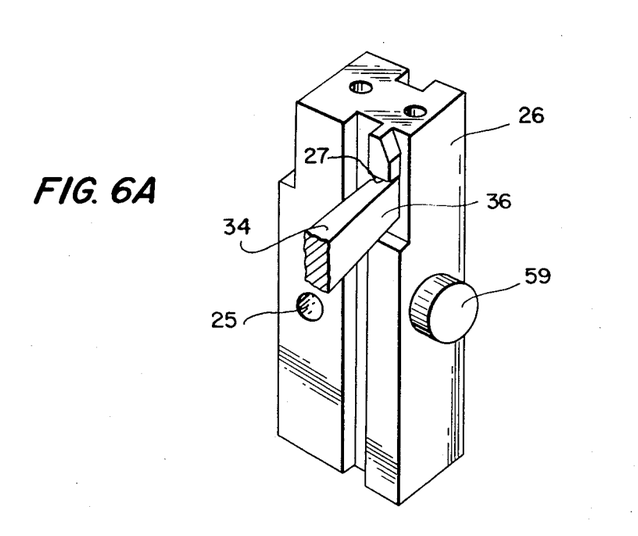
FIG. 6A is a perspective rear view of the retainer means.

The cartridge 19 has a slot therein adjacent the lower edge as shown at 23 in FIG. 4 and this slot is adapted to receive the end portion of a pivoted keeper arm 24. The keeper arm is pivoted at 25 within a slot in a retainer block 26. The block 26 is disposed within the slot 17 in the back plate 12 of the guideway 11. As shown in FIGS 6 and 6A the retainer block 26 has grooves formed in each side surface to receive the plates 18. The retainer block 26 has a cutout portion 27 adjacent the rear edge thereof for a purpose which will become more fully apparent hereinafter. The keeper arm 24 is spring urged by means of spring 28 so that the finger portion on the end of the keeper arm is urged into engagement with the aperture 23 in the cartridge 19. It can also be seen that the lower edge of the cartridge engages a shoulder 29 on the retainer block so that the cartridge is firmly retained in a fixed position with respect to the retainer block 26 by engagement of the keeper arm within the slot 23 and by engagement of the lower edge of the cartridge with the shoulder 29.

Figure 5:
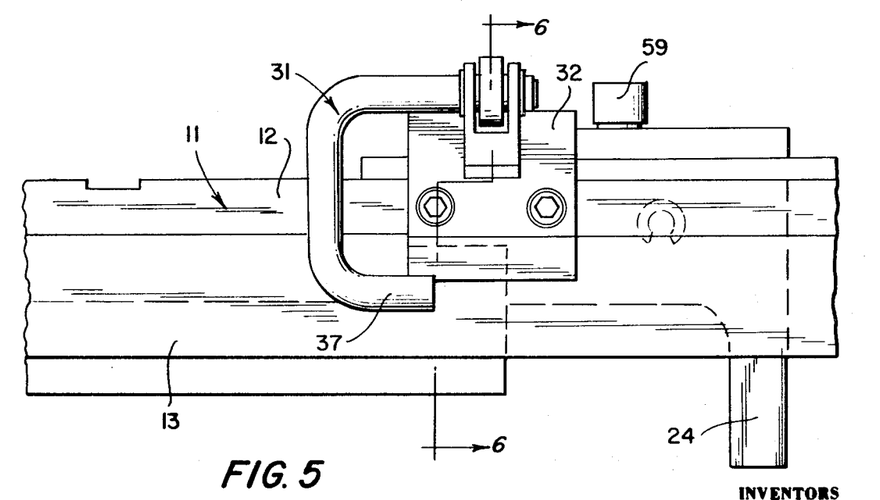
FIG. 5 is a elevational view of the latch shown in FIG. 3.

There is also shown in FIGS. 3, 5 and 6 a latch mechanism generally shown at 31 which performs the function of latching the cartridge in its upper position. The general location of the latch mechanism 31 on the guideways 11 is shown in FIG. 1. It can be seen that the latch mechanism is located approximately midway along the length of the guideways 11 and a separate latch is provided for each guideway 11. The latch is fixed to the guideways 11 as seen in FIG. 5 by securing a latch support plate 32 to the back plate 12 of the guideways 11. Pivoted on a pivot pin 33 is a latch 34 having a spring 35 to urge the latch 34 into the position shown in FIG. 6. In this position a finger 36 on the end of latch 34 engages within the cutout 27 in retainer block 26. At the opposite end of the latch 34 is pivoted an operating arm 37 having a down turned end portion which may be grasped and pulled to release the finger 36 from engagement with the cutout 27 to permit the retainer block and cartridge secured thereon to slide down the guideways 11 to the lower-most position.

Figure 7:
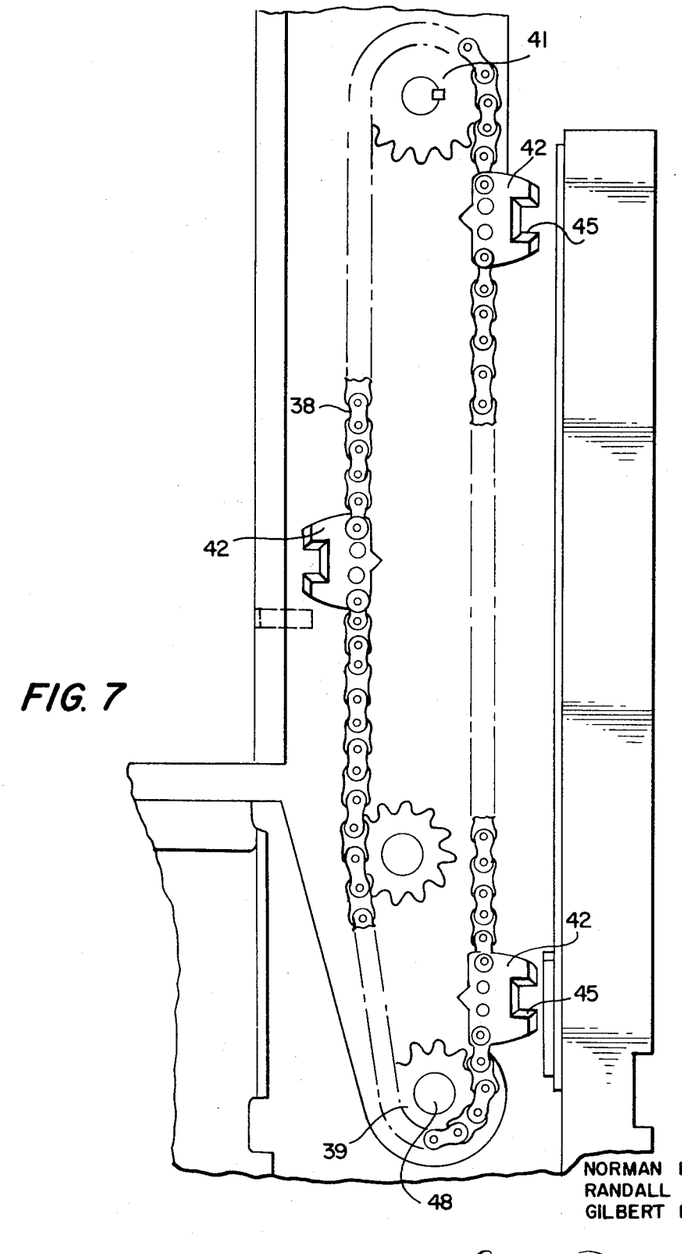
FIG. 7 is a side elevational view of the means for moving the cartridges vertically.
Figure 9:
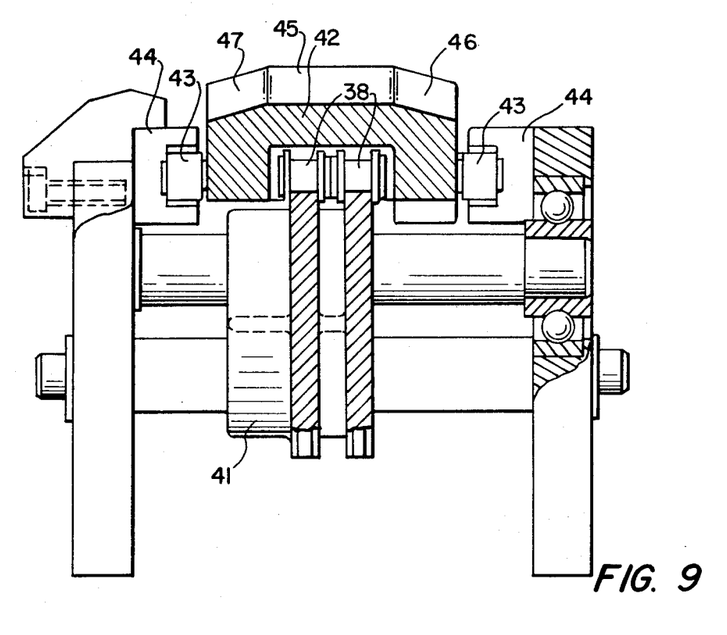
FIG. 9 is a top plan view of the mechanism shown in FIG. 7
Figure 10:
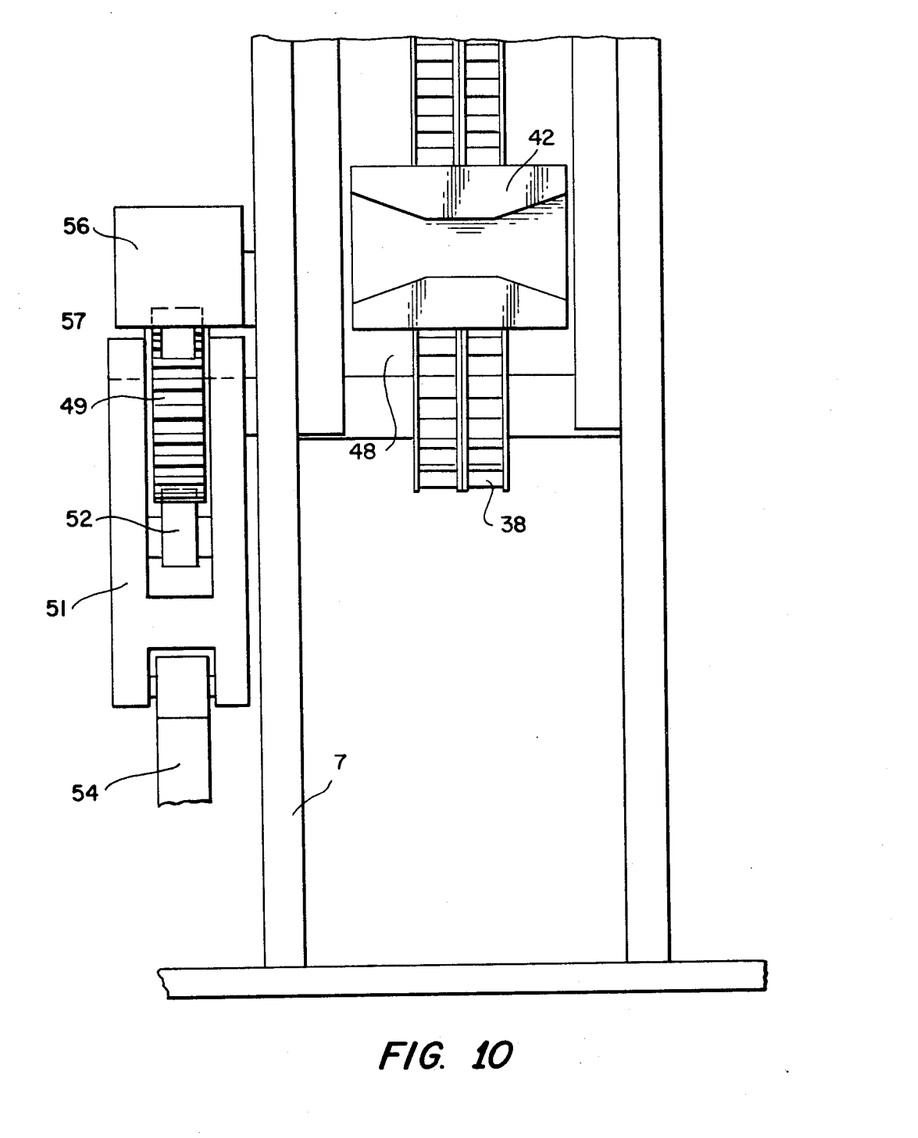
FIG. 10 is a bottom plan view of the mechanism shown in FIG. 7.

Mounted at a work station adjacent the walking beam 3 is a mechanism for vertically indexing the cartridge so as to shift the cartridge within the trackway 11 between the upper-most and lower-most positions thereof. This driving mechanism is shown in greater detail in FIGS. 7 to 10 inclusive There is provided a pair of vertically extending chains 38 as seen in FIGS. 7, 9 and 10 and these chains pass over sprocket wheels 39 and 41 located at the lower and upper ends of the chains respectively. Mounted on these chains are roller lugs 42 which are spaced along the length of the chain generally as shown in FIG. 7. The roller lugs 42 have rollers 43 mounted on the ends thereof as shown in FIG. 9 which rollers are adapted to be received within fixed trackways 44. The face of the roller lugs is provided with a groove 45 and has cammed end portions 46 and 47 respectively.

Figure 8:
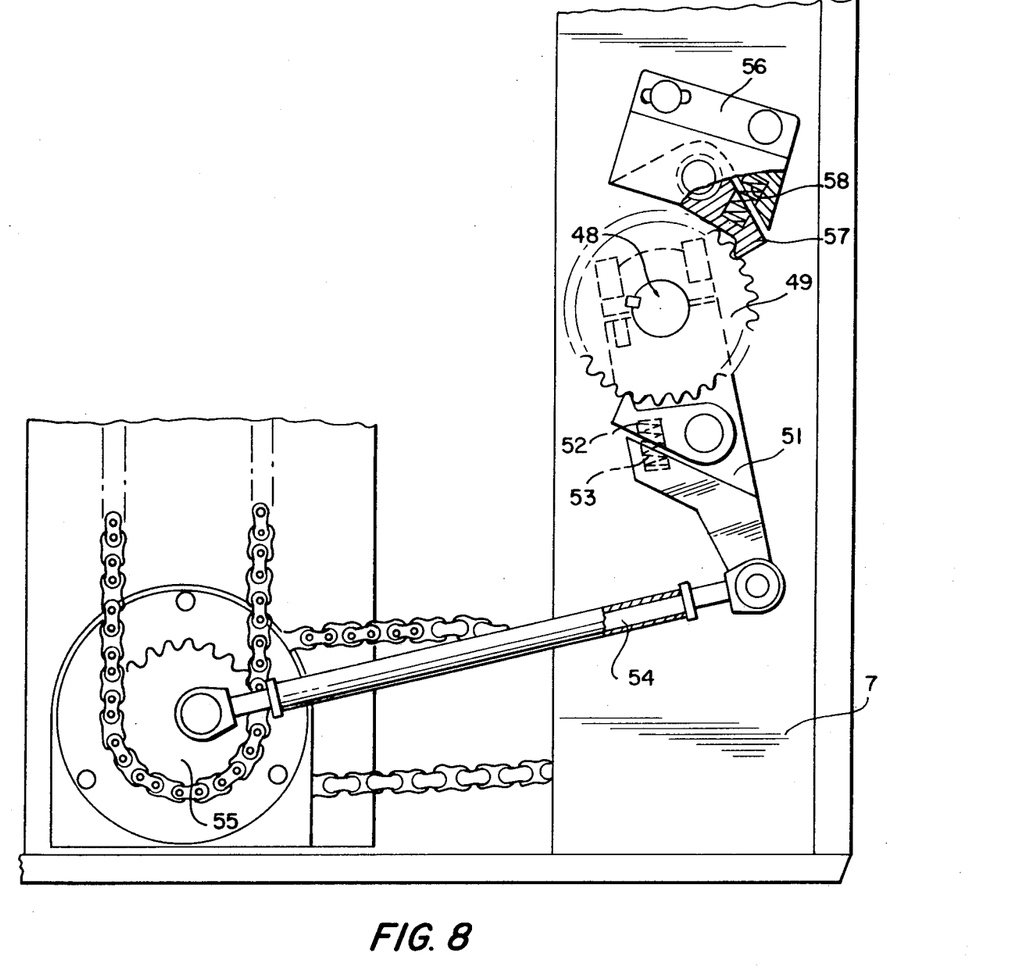
FIG. 8 is a partial elevational view of the drive means for the mechanism shown in FIG. 7.

The lower sprocket 39 is secured to a shaft 48 having a ratchet 49 secured to the outer end thereof as shown more clearly in FIG. 8. Pivoted on the shaft 48 is a pawl holder 51 having a pawl 52 pivoted thereon and spring urged by means of spring 53 into engagement with the ratchet 49. The outer end of the pawl holder 51 is pivoted to a crank arm 54 which has the opposite end thereof eccentrically mounted on gear wheel 55. Gear wheel 55 is chain driven from the motor 4. Fixed to the support base 7 is a pawl holder 56 having a pivoted pawl 57 mounted thereon and spring urged by means of spring 58 into engagement with the ratchet 49. The mechanism is so arranged that rotation of the gear wheel 55 through one-half of its revolution will cause the pawl 52 to move the rachet wheel 49 through a fraction of a revolution corresponding to the width of one gear tooth. The ratchet 49 will be retained in this position by the pawl 57 while the pawl 52 releases to return to its original position during the other half revolution of gear wheel 55.

The retainer block 26 has a roller or pin 59 as seen more clearly in FIG. 4 and this pin 59 is adapted to be engaged in the groove 45 when the rotary mechanism is indexed to position a guideway 11 having a cartridge 19 disposed therein and slidable vertically with the retainer block gripping the lower edge thereof.

When the roller lug 42 reaches the upper-most point thereof along its vertical path of travel in trackways 44 an abutment on the rear surface thereof actuates a microswitch 61 (FIG. 1). This microswitch closes a circuit to actuate the drive mechanism 62 to index the rotary cartridge supporting mechanism to position the next guideway 11 with the slidable cartridge 19 therein in position to be engaged by the roller lug to index the cartridge vertically. The rotary cartridge holder is driven from the motor 4 by chain drive 63 and a cam 64 on a drive shaft actuates microswitch 65 to deactivate the drive means when the next guideway is in position and in engagement with the vertical indexing means. The clutch means and gear mechanism for rotating the rotary cartridge supporting means is conventional and is not shown in detail.

The operation of the presently disclosed parts transfer and storage mechanism is as follows. Assuming that the device is to be utilized to store circuit boards following the completion of a manufacturing process, initially all of the cartridges 19 will be empty and will be disposed at their lower-most positions in the guideways 11. The lower edge of each cartridge will be engaged by the keeper arm 24 so that the position of the cartridge will be preset with respect to the guideways 11. The roller or pin 59 on the rear surface of retainer block 26 which is in position adjacent the drive means will be engaged in the slot 45 in roller lug 42. The motor 4 will be energized to cause the walking beam 3 to move parts across the upper surface of the feed support stand 2 and feed these parts individually into the slots within the cartridge 19. The mechanism is synchronized so that as an individual part is fed into the cartridge 19 the crank arm 54 will cause the pawl 52 to engage the ratchet wheel 49 and index the cartridge vertically so that the next lower empty slot within the cartridge is positioned adjacent the walking beam 3. When the cartridge is fully loaded and the roller lug moves to its upper-most position the latch 34 engages the cutout portion 27 in the retainer block 26 and the microswitch 61 is actuated to cause the rotary drive mechanism 62 to operate to index the cartridge support base to position the next adjacent cartridge in engagement with the next roller lug 42 on the vertical chain drive. The filled cartridge is retained in its upper-most position by engagement of the latch 34 with the retainer block 26. At a station on the opposite side of the rotary cartridge support an operator will manually release the keeper arm 24 from the cartridge 19 and slide the cartridge 19 vertically of out guideway and replace this cartridge with an empty cartridge. After securing the empty cartridge in engagement with the keeper arm 24 the operator will pull the operating arm 37 to release the retainer block 26 from engagement with the latch 34 and permit the cartridge to slide downwardly to its lower-most position. Filled cartridges may be emptied by the device by simply reversing the process. Obviously the cartridges may be moved from the upper-most position to the lower most position by the drive means or vice versa.

It can be seen that by virtue of the present invention parts may be rapidly stored in cartridges or removed therefrom without any delays due to limitations on the speed of operation of the parts transfer device. The cartridges are precisely located within the guideways by means of the retainer block and keeper arm and the fixed tracks extending the length of the guideways. The drive mechanism provides a means for precisely indexing the cartridges to assure proper alignment of the cartridge shelves with the walking beam feeder means. The latch means which engages the retainer block when the cartridge reaches its upper-most position provides a means whereby the vertical indexing means need only be used for indexing the cartridge during loading or unloading operations. That is to say, it is not necessary to utilize the vertical indexing means to return a filled cartridge to its original position before indexing another cartridge into position.

Obviously many modifications and variations of the present invention are possible in light of the foregoing teachings.

We claim:

1. In a device for storing and delivering a plurality of parts, cartridges for receiving the parts, means for supporting a plurality of said cartridges in spaced aligned relationship, said supporting means including retainer means mounting said cartridges in said supporting means for vertical sliding movement, drive means for engaging said retainer means sequentially for indexing said cartridges vertically, latch means on said supporting means for latching the cartridges and retainer means in a raised position.

2. In a device according to claim 1 wherein said supporting means comprises a rotary stand having vertically extending pairs of guideways mounted in spaced relationship around the periphery of said stand.

3. In a device according to claim 2 wherein a single cartridge is adapted to be received within each pair of guideways and is adapted to slide vertically therein.

4. In a device according to claim 3 wherein each said retainer means comprises a pivoted finger adapted to engage the lower end portion of a cartridge, said retainer means being vertically slidable in a pair of guideways.

5. A device for stacking individual identical parts for storage in cartridges and for removing the parts from storage comprising a rotary cartridge holder, a plurality of guideways mounted on said rotary holder for receiving said cartridges, retainer means mounted for vertical movement in each guideway for gripping a cartridge, a pin on each retainer means, driving means for indexing said cartridges vertically, said driving means being disposed in a fixed position with respect to said rotary holder, said driving means including at least one lug whereby, when said rotary holder is rotated to bring a cartridge and associated retainer means adjacent said drive means, said lug engages said pin and said drive means indexes said cartridge vertically.

6. A device according to claim 5 and further including latch means operatively associated with each guideway for latching the cartridge and retainer means in a raised position.

7. A device according to claim 5 wherein said driving means includes a vertically extending endless chain having a plurality of lugs mounted thereon and pawl and sprocket means for moving said chain in fixed increments corresponding to the spacing of the items stored in the cartridges.

8. A device according to claim 5 and further including means for engaging and latching said cartridges in raised positions.

9. A device for stacking individual identical parts for storage in cartridges and for removing the parts from storage comprising, a pair of vertically spaced plates supported for rotary movement, a plurality of vertically extending guideways fixedly mounted on said plates in spaced relation around the periphery of said plates, each said guideway having a slot therein, a cartridge retainer slidable in said slot, said cartridge retainer including means for gripping a cartridge and a drive engaging pin, drive means for engaging said drive pin and for indexing sequentially each said cartridge vertically between lower and upper end positions and means operatively associated with said drive means for rotating said pair of vertically spaced plates to bring successive cartridges into engagement with said drive means, means rendering said last named means operative where the cartridge in engagement with the drive means is indexed to an end position.

10. A device according to claim 9 and further including latch means mounted adjacent each of said guideways for engaging said retainer means and holding the cartridge in a raised position when the retainer means and cartridge are disengaged from the drive means.

* * * * *